United States Patent
Prix et al.

(10) Patent No.: US 8,647,237 B2
(45) Date of Patent: Feb. 11, 2014

(54) METHOD OF OPERATING A DRIVE TRAIN OF A MOTOR VEHICLE AND CORRESPONDING DRIVE TRAIN

(75) Inventors: Daniel Prix, Ebental (AT); Rene Scheucher, Gnas (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 328 days.

(21) Appl. No.: 13/186,544

(22) Filed: Jul. 20, 2011

(65) Prior Publication Data

US 2012/0018274 A1  Jan. 26, 2012

Related U.S. Application Data

(60) Provisional application No. 61/367,181, filed on Jul. 23, 2010.

(30) Foreign Application Priority Data

Feb. 8, 2011  (DE) .......................... 10 2011 010 616

(51) Int. Cl.
*B60W 10/02* (2006.01)
*B60W 10/04* (2006.01)

(52) U.S. Cl.
USPC ............................................ 477/181; 477/85

(58) Field of Classification Search
USPC .................................................... 477/181, 85
See application file for complete search history.

(56) References Cited

U.S. PATENT DOCUMENTS

| 1,121,114 | A | * | 12/1914 | Moore | 60/718 |
|---|---|---|---|---|---|
| 1,194,479 | A | * | 8/1916 | Clay | 477/181 |
| 2,923,387 | A | * | 2/1960 | Brown | 477/175 |
| 4,646,891 | A | * | 3/1987 | Braun | 477/175 |
| 4,873,637 | A | * | 10/1989 | Braun | 701/67 |
| 6,008,606 | A | | 12/1999 | Arai et al. | |
| 6,939,265 | B2 | * | 9/2005 | Rustige et al. | 477/84 |
| 7,044,882 | B2 | * | 5/2006 | Eisenhardt | 475/298 |
| 7,156,771 | B2 | * | 1/2007 | Teraoka | 477/5 |
| 2002/0073802 | A1 | | 6/2002 | Sakamoto et al. | |
| 2008/0047798 | A1 | | 2/2008 | Wittkopp et al. | |
| 2008/0182693 | A1 | | 7/2008 | Holmes | |

FOREIGN PATENT DOCUMENTS

| CH | 249212 | 9/1944 |
|---|---|---|
| CH | 666098 | 6/1988 |
| DE | 3522062 | 1/1987 |
| DE | 29824502 | 5/2001 |
| DE | 102004037181 | 3/2006 |

(Continued)

OTHER PUBLICATIONS

European Search Report for European Patent Application No. 11005878.1, dated Dec. 5, 2011, and English translation thereof.

*Primary Examiner* — Sherry Estremsky
(74) *Attorney, Agent, or Firm* — Dickinson Wright PLLC

(57) ABSTRACT

A method for selectively coupling a motor to a drive train of a motor vehicle using a clutch having a first clutch part driven by the motor, a second clutch part associated with the drive train and an actuator, the method includes the steps of: accelerating the first clutch part while simultaneously activating the actuator during a first actuation phase without engaging the first and second clutch parts; suspending activation of the actuator until a predefined rotational speed difference is reached between the first and second clutch parts; and engaging the first and second clutch parts during a second actuation phase upon reaching the predefined speed difference.

13 Claims, 2 Drawing Sheets

(56) References Cited

FOREIGN PATENT DOCUMENTS

| DE | 202006014117 | 3/2008 |
| DE | 102007009568 | 9/2008 |
| DE | 202009014490 | 3/2010 |
| DE | 202009007977 | 4/2010 |
| DE | 102009009459 | 8/2010 |

* cited by examiner

US 8,647,237 B2

METHOD OF OPERATING A DRIVE TRAIN OF A MOTOR VEHICLE AND CORRESPONDING DRIVE TRAIN

CROSS-REFERENCE TO RELATED APPLICATIONS

This application claims priority to and the benefit of German Application No. 10 2011 010 616.2 filed Feb. 28, 2011 and U.S. Provisional Application No. 61/367,181 filed Jul. 23, 2010. The entire disclosure of each of the above applications is incorporated herein by reference.

FIELD

The present invention relates to a method of operating a drive train of a motor vehicle.

BACKGROUND OF THE INVENTION

Drive trains which can be adapted to the respective driving conditions present are used in motor vehicles to improve driving dynamics. In this respect, cut-off clutches are frequently used which serve inter alia selectively to couple specific components of the drive train with one another or to cut them off from one another. For example, it can be advantageous in certain driving situations with hybrid vehicles to cut off an electric motor of the hybrid drive from the other components of the drive train, for instance when an internal combustion engine of the hybrid drive delivers the required drive torque and the drive power of the electric motor is not required. A safety shut-down in the event of operating problems can also be ensured by a cut-off clutch. Ultimately, such cut-off clutches thus contribute to the improvement of the total efficiency of the drive train, of the driving dynamics, of the response of the vehicle on an ESP engagement and of the response on an operating problem in the electrical traction components.

The efficient control of the cut-off clutch is of material importance so that its advantages come into effect to the greatest possible extent. An engagement of the clutch should in particular take place as fast and as reliably as possible so that the drive train can be adapted fast to changing driving conditions.

SUMMARY OF THE INVENTION

It is therefore an object of the invention to provide a reliable and highly dynamic method of operating a drive train which can be selectively coupled to a motor by a clutch.

In accordance with the invention, the method of operating a drive train of a motor vehicle having a motor which can be selectively coupled to the drive train by means of a clutch which is actuable by an actuator and which has a first clutch part associated with a drive shaft of the motor and a second clutch part associated with the drive train, comprises the following steps on the engagement of the clutch:
  accelerating the first clutch part by the motor for reducing a rotational speed difference between the first clutch part and the second clutch part with a simultaneous activation of the actuator during a first actuation phase for overcoming a dead space of the clutch, wherein the clutch parts are not yet in engagement with one another;
  suspending the activation of the actuator after overcoming the dead space and before bringing the clutch parts into engagement as long as a predefined rotational speed difference has not yet been reached;
  activating the actuator again during a second actuation phase for bringing the clutch parts into engagement when the predefined rotational speed difference has been reached or is fallen below.

In other words, the rotational speed of the first clutch part is first synchronized with the rotational speed of the second clutch part in that the motor accelerates the first clutch part. A completed synchronization is to be understood as a state in which the two clutch parts have a predefined rotational speed difference which is selected as a rule as comparatively small as possible to allow a problem-free engagement of the clutch. The predefined rotational speed difference is in particular to be dimensioned such that the engagement procedure can be carried out without impairing the driving comfort and simultaneously an actuation time is kept small.

On operation of a vehicle and in an open state of the clutch, the first clutch part as a rule does not rotate or only rotates slowly, whereas the second clutch part rotates with the rotational speed of the drive train. The rotational speed of the first clutch part must therefore be increased.

To improve the dynamic response of the clutch, the actuator actuating the clutch is already activated during the acceleration of the first clutch part (first actuation phase) to overcome the dead space of the clutch. I.e. the time required for the synchronization is simultaneously utilized to overcome the dead space of the clutch.

A "dead space" of the clutch is to be understood, for example, as a spacing between the clutch parts in an open state of the clutch which has to be passed through before the clutch parts are brought into contact with one another and an engagement of the clutch parts takes place.

As long as the synchronization has not yet been completed, and the predefined rotational speed difference has not yet been reached or fallen below, the activation of the actuator is interrupted in an actuation state in which the clutch parts are just before engagement. In this state, the dead space of the clutch has already almost been completely overcome.

The actuator is activated again (second actuation phase) when the predefined rotational speed difference is reached or fallen below so that the clutch parts are brought into engagement and the engagement process is thus completed.

Ultimately, a time period which is required for accelerating the first clutch part for reaching a predefined difference between the rotational speed of the first church part and the rotational speed of the second clutch part is utilized for overcoming the dead space of the clutch to increase the actuation dynamics of the clutch. If the dead space of the clutch has already been overcome before the predefined rotational speed difference was reached, the activation of the actuator is suspended just before a bringing into engagement of the clutch parts.

Further embodiments of the invention are set forth in the description, in the dependent claims and in the drawings.

A monitoring device can be associated with the actuator with which a monitored signal is produced at least during the second actuation phase which indicates a situation preventing the bringing into engagement of the clutch. With a dog clutch, such a situation can, for example, be an out-of-mesh position of the two clutch parts. The monitoring device monitors the engagement of the clutch at least during the second actuation phase and delivers a monitored signal which can be utilized, for example, to optimize the control of the clutch or of the actuator actuating it.

The actuator in particular includes an electrically operated actuator motor. In this case, the voltage applied to the actuator and/or the current applied to the actuator can be determined by the monitoring device for producing the monitored signal.

The activation of the actuator can be restricted for at least so long during the second actuation phase as long as the monitored signal exceeds or is below a threshold value. A blocking of an actuation mechanism of the actuator on the presence of the above-described situation preventing the bringing into engagement of the clutch is avoided by this procedure. It is in particular monitored whether a power increase can be observed at the actuator motor which would, for example, indicate an out-of-mesh position of the clutch parts in a dog clutch.

In accordance with an embodiment, an energy store is associated with the actuator which converts at least some of the actuation movement produced by the actuator into actuation energy and stores said actuator energy during a situation preventing the bringing into engagement of the clutch—in particular during the restricted activation of the actuator. The actuation energy taken up by the energy store can be output as soon as the situation preventing the bringing into engagement of the clutch is cancelled. The load on the clutch parts and on the components of the actuator is thereby reduced whereas simultaneously a fast engagement of the clutch is ensured when the situation preventing the bringing into engagement of the clutch—for example an out-of-mesh position of the clutch parts of a dog clutch—is no longer present.

To improve the engagement dynamics of the clutch, the dead space of the clutch to be overcome can be determined on the basis of data of a sensor with which a position of the first clutch part and/or of the second clutch part can be determined. For example, with a suitable embodiment of the sensor, the actually present spacing between the two clutch parts in a disengaged state of the clutch can be determined and from this—while taking account of the geometrical circumstances of the clutch parts, for instance the design of the teeth of a dog clutch—a dead space to be overcome can be calculated. It is also possible to determine the position of only one of the two clutch parts if, for example, the other clutch part is arranged in an axially fixed respect. The sensor can, for example, include a rotary encoder which determines the position of a drive shaft of the motor—and thus indirectly the position of the first clutch part—or the position of the first clutch part.

The invention furthermore relates to a drive train of a motor vehicle having a motor which can be selectively coupled to the drive train by means of a clutch which can be actuated by an actuator and which has a first clutch part associated with a drive shaft of the motor and a second clutch part associated with the drive train, wherein a motor control unit is associated with the motor and an actuator control unit is associated with the actuator, said actuator control unit being designed so that at least one of the above-described embodiments of the method in accordance with the invention can be carried out.

The motor control unit and the actuator control unit can form an assembly, in particular an integrated control unit.

As already mentioned above, the clutch can be a dog clutch.

The motor is in particular an electric motor which is, for example, a component of a hybrid drive of the motor vehicle.

BRIEF DESCRIPTION OF THE DRAWINGS

The present invention will be described in the following purely by way of example with reference to advantageous embodiments and to the enclosed drawings. There are shown.

DETAILED DESCRIPTION OF THE EMBODIMENTS

Figure 1:
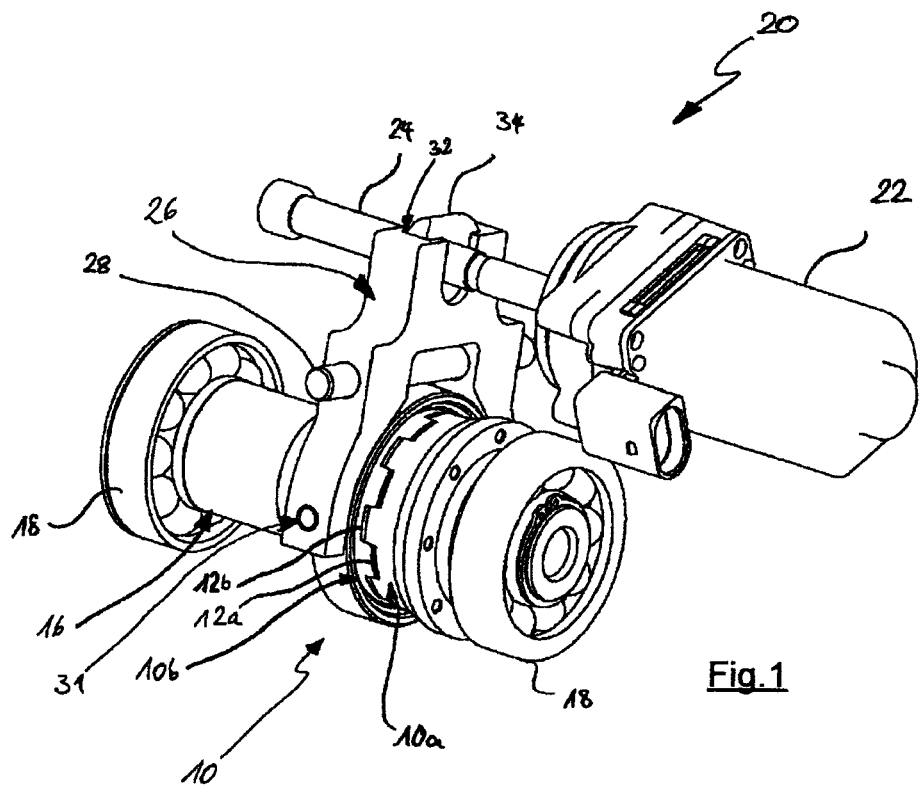
FIG. 1 a perspective view of a part of an embodiment of the drive train in accordance with the invention with a dog clutch and an actuator associated with the clutch.
Figure 2:
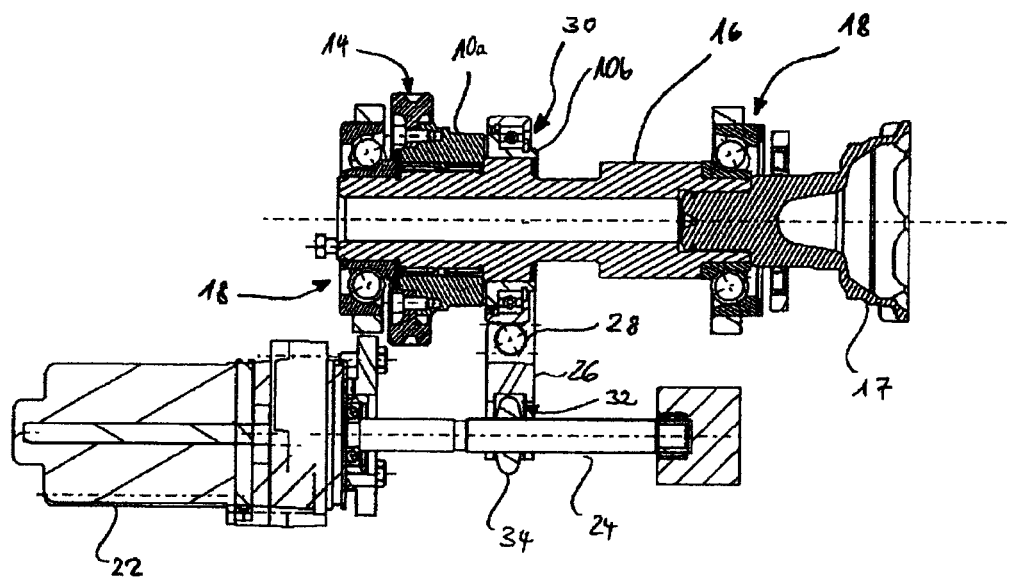
FIG. 2 a sectional view through the clutch and the actuator of FIG. 1.

FIGS. 1 and 2 show a dog clutch 10 with a clutch part 10a and a clutch part 10b. The clutch parts 10a, 10b each have complementary teeth 12a or cut-outs 12b. The dog clutch 10 is in engagement in the state shown in FIG. 1.

The clutch part 10a is—as shown in FIG. 2—rotationally fixedly connected to a toothed wheel 14 which can be driven, for example by an electric motor, not shown, of a hybrid drive of a motor vehicle, to make a rotary movement. In the shown engaged state of the clutch 10, this movement is transferred to the clutch part 10b which is in turn connected rotationally fixedly, but axially displaceably, to a drive shaft 16 drive-effectively coupled with components of a drive train of the motor vehicle. In the embodiment shown, the drive shaft 16 is rotationally fixedly coupled with a wheel flange 17. The drive shaft 16 is furthermore supported by bearings 18 at the motor vehicle.

It is understood that the drive shaft 16 can be connected to the electric motor in alternative embodiments of the drive train, whereas the clutch part 10a is in drive-effective connection with further components of the drive train.

On a decoupling of the clutch 10—for instance when a contribution of the electric motor to the forward drive of the vehicle is no longer required—the electric motor driving the toothed wheel 14 is, for example, switched over from torque regulation to rotational speed regulation and the clutch 10 thus ideally runs without load. In real operation, however, residual torques are also applied to the clutch in this state which have to be overcome to disengage the clutch 10 from an actuator 20 to separate the clutch parts 10a, 10b from one another.

The actuator 20 includes an actuator motor 22 whose rotational drive movement is converted via a spindle 24 and a nut 34 into a pivoting of a shift fork 26 designed as a pivot fork. The shift fork 26 is supported approximately centrally by a support pin 28. A connection of the shift fork 26 to the clutch part 10b includes a grooved ball bearing 30 (FIG. 2) which takes up relative movements between the fork 26 and the clutch part 10b. The groove ball bearing 30 is in turn connected to the shift fork 26 via a swivel joint 31. At the spindle side, the shift fork 26 is provided with a slit 32 in which the nut 34 with an integrated sliding piece mounted on the spindle 24 is used. The nut 34 is preferably made from plastic for a simplified manufacture and to minimize friction.

On an activation of the actuator motor 22, the shift fork 26 is pivoted toward the actuator motor 22 by a movement of the nut 34 so that the clutch part 10b is moved away from the clutch part 10a. The clutch part 10b is for this purpose connected in the manner of a sliding collar by a toothed arrangement rotationally fixedly, but axially displaceably, to the drive shaft 16.

The activation of the actuator motor 22 takes place, for example, for a predefined time period so that the clutch part 10b adopts a predefined position with respect to the clutch part 10a in an open state of the clutch 10.

If the clutch should be closed again, the clutch parts 10a, 10b must be synchronized, i.e. they must be brought to substantially the same rotational speed level.

For this purpose, the clutch part 10a which is idling or is rotating more slowly than the clutch part 10b coupled with the drive train is accelerated by the electric motor. To utilize the time required for this purpose efficiently, the actuator motor 22 is simultaneously activated to move the clutch part 10b toward the clutch part 10a. If a predefined rotational speed difference has not yet been reached between the clutch parts 10a, 10b, although the dead space of the clutch 10 has already substantially been passed through and an engagement of the teeth 12a or cut-outs 12b is just before completion, the activation of the actuator motor 22 and the spacing reached up to then is maintained between the clutch parts 10a, 10b. In the meantime, the acceleration of the clutch part 10a is continued until the predefined rotational speed difference between the clutch parts 10a, 10b is reached or fallen below. The engagement of the clutch 10 can then be continued, i.e. the actuator motor 22 is activated again, to complete the engagement of the clutch 10.

On the engagement procedure of the clutch 10, the situation can arise that the teeth 12a of the clutch parts 10a, 10b hit one another so that an engagement of the dog clutch 10 is not easily possible. This situation can be recognized, for example, by a current increase at the actuator motor 22. To prevent damage to the components of the actuator 20 and the clutch 10, the voltage applied to the actuator motor 22 is limited and thus the actuation restricted. In particular a blocking of the spindle/nut mechanism is thereby prevented.

The actuator 20 can have a buffer mechanism or energy storage mechanism which takes up the actuation movement generated by the actuator motor 22 on a reduced or restricted activation thereof and stores it for so long until the teeth 12a are opposite complementary cut-outs 12b. The then possible engagement of the clutch 10 is assisted by an output of the actuation movement stored in the buffer mechanism, for example in the form of a deformation of an elastic element.

Figure 3:
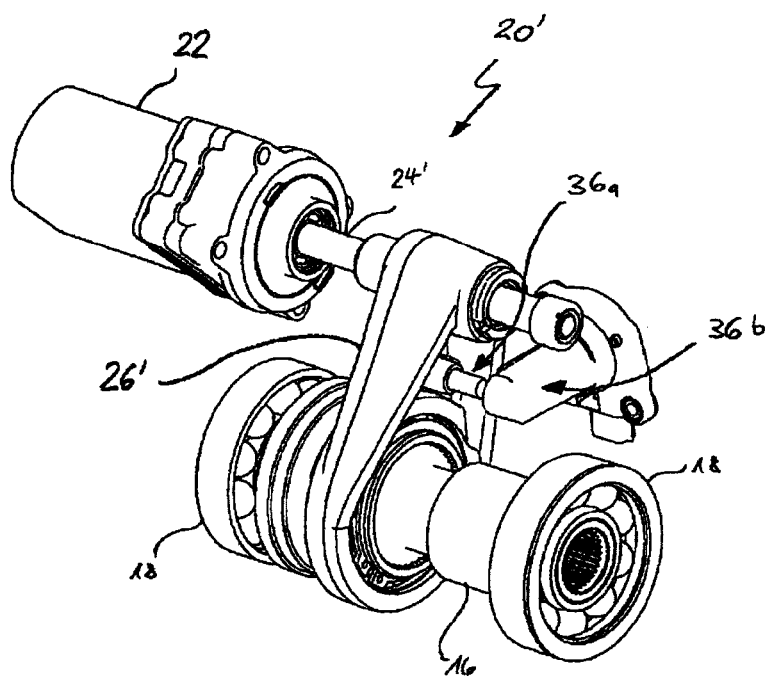
FIG. 3 a perspective view of a part of a further embodiment of the drive train in accordance with the invention with a dog clutch and an actuator associated with the clutch.
Figure 4:
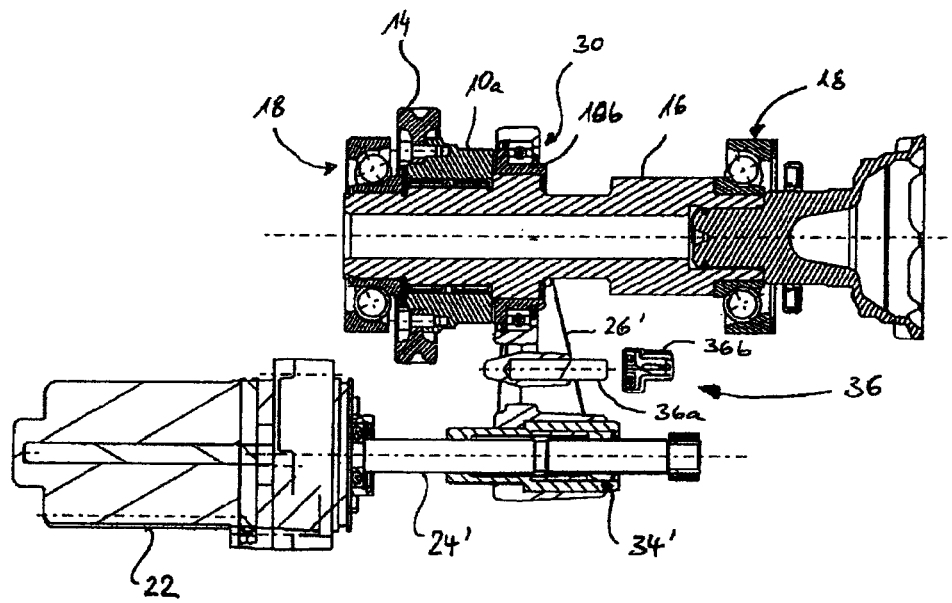
FIG. 4 a sectional view through the clutch and the actuator of FIG. 3.

FIGS. 3 and 4 show an alternative embodiment 20' of the actuator with an axially displaceable—but not pivotable—shift fork 26'. The shift fork 26' cooperates with a nut 34' which is connected to a spindle 24' via a movement thread. The nut 34' can be directly connected to the fork 26'. Alternatively, a spring (not shown) can be provided, for example, between the two named components which acts as a buffer mechanism of the kind described above.

A sensor 36 which includes a sensor pin 36a and a sensor element 36b is provided to improve the actuation dynamics of the clutch 10. The sensor element 36b installed in a stationary position allows the determination of a relative position of the sensor pin 36a and thus of the shift fork 26'. Ultimately, the position in which the clutch part 10b is located relative to the axially fixedly arranged clutch part 10a can be determined by the measured data of the sensor element 36b. Since the geometry of the teeth 12a and of the cut-outs 12b is known, the dead space of the clutch 10 to be passed through can be determined which is present in an open state of the clutch 10.

It is understood that the sensor 36 can be provided in an analog manner for the position determination of the shift fork 26 of FIGS. 1 and 2. Alternative or additional sensors for determining the position of the clutch part 10b and/or of the clutch part 10a are, for example, rotary encoders at the actuator motor 22 or at the spindle 24, 24'.

As can be seen from FIG. 1, the teeth 12a have flanks which are arranged not fully parallel to the axis of rotation of the clutch parts 10a, 10b and of the drive shaft 16. The flank angles of the jaw toothed arrangement are designed so that the force equilibrium of the axial force from a jaw toothed arrangement designed in a repelling manner and from the frictional force in the insertion toothed arrangement of the clutch part 10b on the drive shaft 16 is balanced under all friction conditions. It can thus be ensured that the actuator 20, 20' only has to take up small axial forces in a closed and loaded state and therefore only small holding currents are required at the actuator motor 22. Furthermore, the axial force required for opening the clutch 10 under load can be influenced by a suitable selection of the flank angles of the teeth 12a and can thus be adapted to different demands.

Reference Numeral List 10 dog clutch
10a, 10b clutch part
12a tooth
12b cut-out
14 toothed wheel
16 drive shaft
17 wheel flange
18 bearing
20, 20' actuator
22 actuator motor
24, 24' spindle
26, 26' shift fork
28 bearing pin
30 grooved ball bearing
31 swivel joint
32 slit
34, 34' nut
36 sensor
36a sensor pin
36b sensor element

The invention claimed is:

1. A method of operating a drive train of a motor vehicle having a motor selectively coupled to the drive train by a clutch that is actuable by an actuator, the clutch including a first clutch part associated with a drive shaft of the motor and a second clutch part associated with the drive train, with an engagement of the clutch comprising the steps of:

accelerating the first clutch part by the motor to reduce a rotational speed difference between the first clutch and the second clutch part with a simultaneous activation of the actuator during a first actuation phase to overcome a dead space of the clutch, wherein the first and second clutch parts are not engaged during the first actuation phase;

suspending the activation of the actuator after overcoming the dead space and before bringing the first and second clutch parts into engagement until a predefined rotational speed difference is reached;

activating the actuator again during a second actuation phase to bring the first and second clutch parts into engagement when the predefined rotational speed difference is reached or is fallen below.

2. The method in accordance with claim 1, wherein a monitoring device is associated with the actuator with which a monitored signal is produced during the second actuation phase, and wherein a value of the monitored signal exceeding a threshold value indicates a situation preventing the engagement of the first and second clutch parts.

3. The method in accordance with claim 2, wherein the actuator includes an electrically operated actuator motor; and
wherein at least one of the voltage applied to the actuator motor and the current applied to the actuator motor is determined by the monitoring device for producing the monitored signal.

4. The method in accordance with claim 2, wherein the activation of the actuator is restricted during the second actuation phase as long as the value of the monitored signal exceeds the threshold value.

5. The method in accordance with claim 1, wherein an energy store is associated with the actuator that converts at least some of the actuation movement produced by the actuator into actuation energy and stored the actuator energy during a situation preventing the engagement of the first and second clutch parts.

6. The method in accordance with claim 5, wherein the energy store stores the actuator during the restricted activation of the actuator.

7. The method in accordance with claim 5, wherein the actuation energy taken up by the energy store is output as soon as the situation preventing the bringing into engagement of the first and second clutch parts ends.

8. The method in accordance with claim 1, wherein the dead space of the clutch to be overcome is determined on the basis of data of a sensor with which a position of the first clutch part and/or of the second clutch part can be determined.

9. A drive train of a motor vehicle comprising:
   a motor selectively coupled to the drive train by a clutch that is actuatable by an actuator, the clutch having a first clutch part associated with a drive shaft of the motor and a second clutch part associated with the drive train;
   a motor control unit associated with the motor; and
   an actuator control unit associated with the actuator;
   wherein the motor control unit is operable to instruct the motor to accelerate the first clutch part to reduce a rotational speed difference between the first clutch part and the second clutch part while the actuator control unit is operable to simultaneously activate th actuator during a first actuation phase to overcome a dead space of the clutch, the first and second clutch parts not being engaged during the first actuation phase;
   the actuator control unit is operable to suspend activation of the actuator after overcoming the dead space and before bringing the first and second clutch parts into engagement as long as a predefined rotational speed difference has been reached or is fallen below.

10. The drive train in accordance with claim 9, wherein the motor control unit and the actuator control unit form an assembly.

11. The drive train in accordance with claim 9, wherein the clutch is a dog clutch.

12. The drive train in accordance with claim 9, wherein the motor is an electric motor.

13. The drive train in accordance with claim 12, wherein the electric motor is a component of a hybrid drive of the motor vehicle.

* * * * *